INVENTOR.
WILLIAM D. COCKRELL
BY Isidore Match
ATTORNEY

Jan. 4, 1966 W. D. COCKRELL 3,227,936
POLYPHASE MOTOR CONTROL ARRANGEMENT
Filed Dec. 11, 1961 2 Sheets-Sheet 2

INVENTOR.
WILLIAM D. COCKRELL
BY Isidore Match
ATTORNEY

United States Patent Office 3,227,936
Patented Jan. 4, 1966

3,227,936
POLYPHASE MOTOR CONTROL ARRANGEMENT
William D. Cockrell, Waynesboro, Va., assignor to General Electric Company, a corporation of New York
Filed Dec. 11, 1961, Ser. No. 158,381
12 Claims. (Cl. 318—138)

This invention relates to A.C. motors. More particularly, it relates to an arrangement for powering a polyphase A.C. motor from a direct current supply.

In many situations where relatively small motors are utilized, particularly where hermetic sealing is indicated, an A.C. motor of the induction or permanent magnet synchronous type is generally preferred to a D.C. motor. In such situations, the use of a D.C. motor presents the disadvantage of having brushes which require maintenance and which undergo hermetic contamination due to their sparking and carbon wear. The use of a synchronous motor in such situations provides an infinitely adjustable constant speed drive and a motor having this characteristic in an inaccessible or controlled ambient condition is quite useful in both the manufacturing and scientific fields.

It is an object of this invention to provide a circuit for powering a polyphase induction motor with a direct current supply.

It is another object to provide a circuit in accordance with the preceding object wherein the phases of the motor can be supplied in rotation by a current flowing continuously from the D.C. supply or can be supplied by a current pulse of maximum width which permits operation without saturation of the windings at low frequencies.

Generally speaking and in accordance with the invention, there is provided in combination with a polyphase motor having a given number of balanced phase windings, a unidirectional potential source and switching means in circuit with the source for producing such given number of discrete balanced phase unidirectional potential outputs to energize the motor windings.

The features of this invention which are believed to be new are set forth with particularity in the appended claims. The invention itself, however, may best be understood by reference to the following description when taken in conjunction with the accompanying drawing which shows an embodiment of a polyphase motor control arrangement according to the invention.

Figure 1:
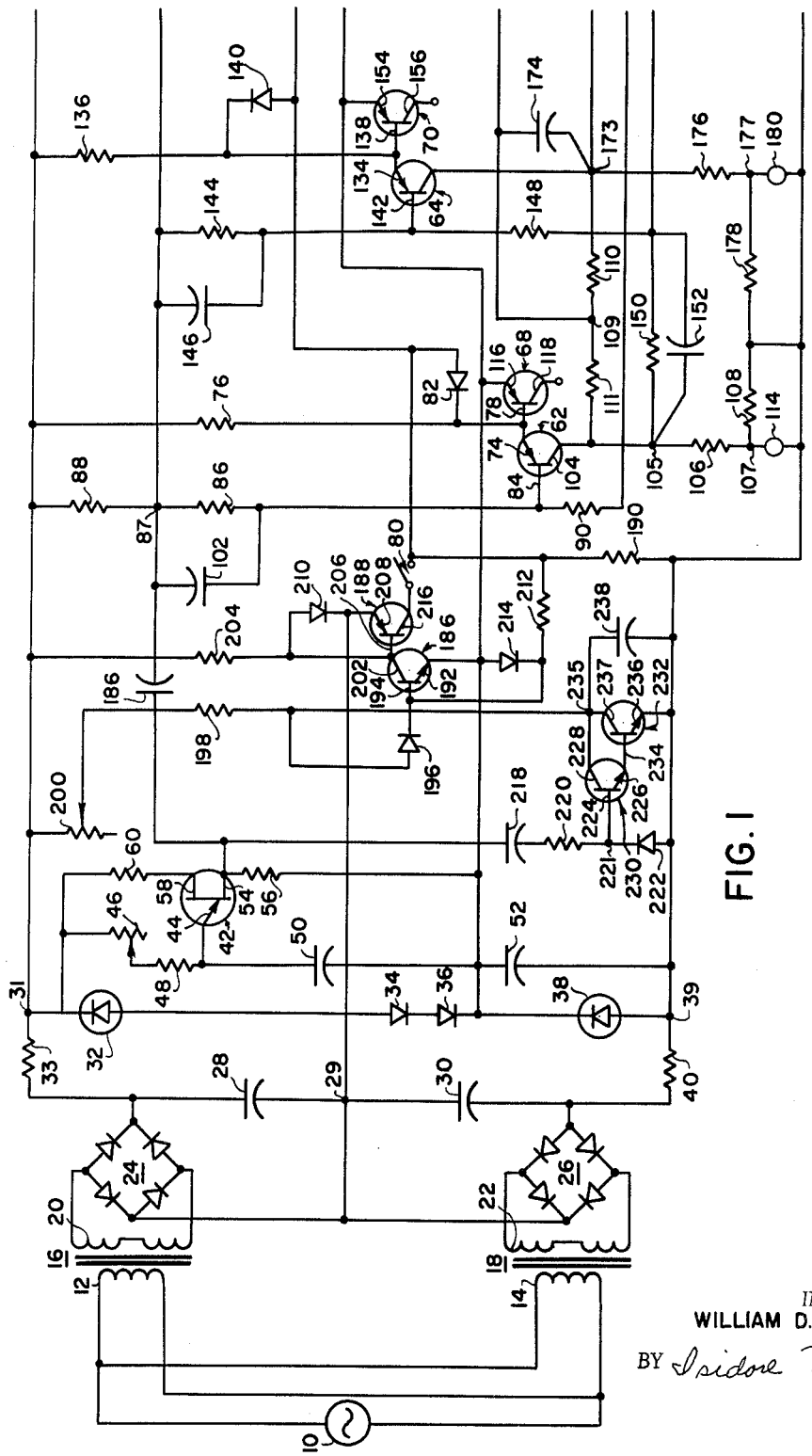
Figure 2:
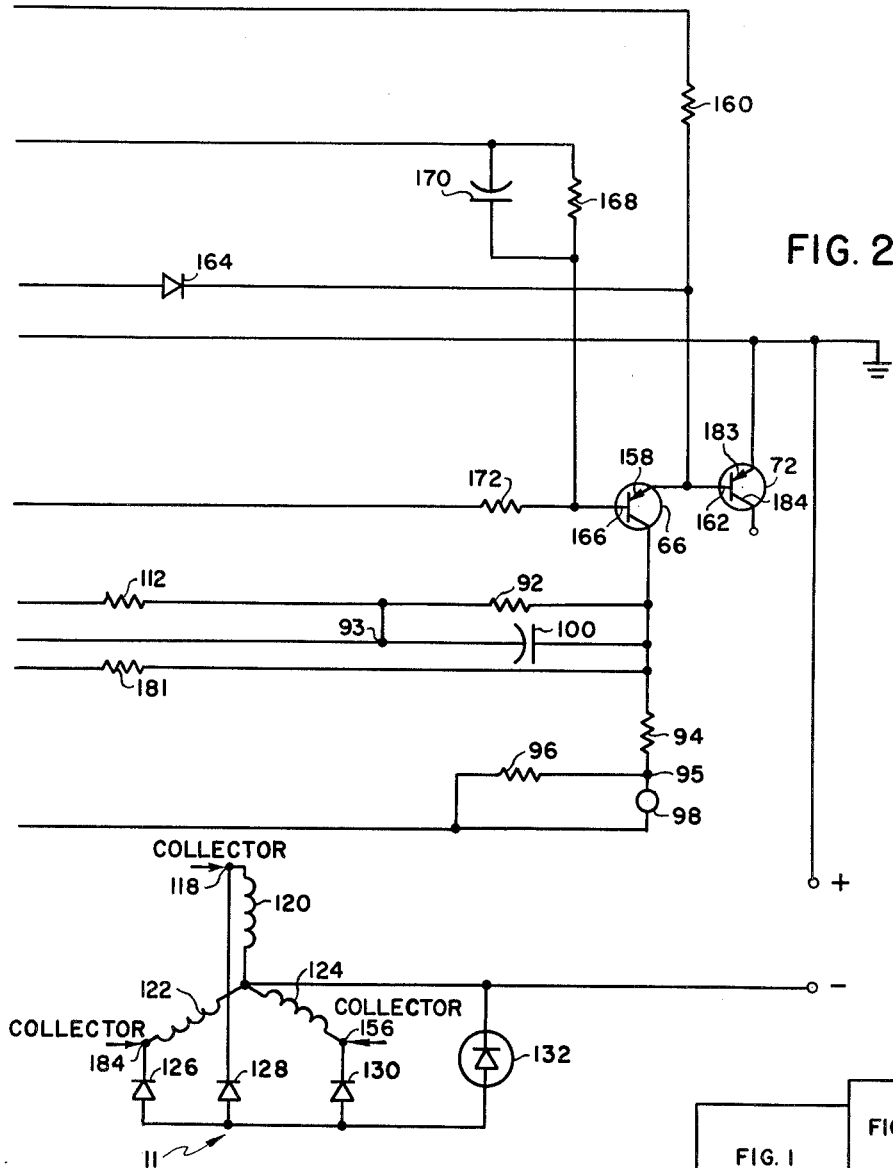
Figure 3:
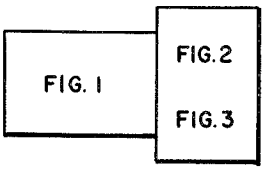

In the drawings, FIGS. 1 and 2 taken together as in FIG. 3 is a schematic depiction of a polyphase motor control arrangement in accordance with the invention.

Referring now to the drawing, the output of the line voltage source 10 which may be 115 volt 60 c.p.s. source is applied to the primary windings 12 and 14 of transformers 16 and 18. In secondary windings 20 and 22 respectively, the line voltage is transformed down to a smaller value such as 24 volts, and these secondary winding voltages are rectified in full wave rectifiers 24 and 26 respectively to provide suitable D.C. voltages such as a voltage of about +24 volts at the positive output terminal of rectifier 24 and a voltage of about −24 volts at the output of rectifier 26. The outputs of rectifiers 24 and 26 are filtered in capacitors 28 and 30 respectively.

The output of rectifier 24 is applied through a resistor 33 to the cathode of a Zener diode 32, the anode of Zener diode 32 being connected to ground through the anode to cathode paths of series connected diodes 34 and 36 whereby voltage regulation is provided between junction point 31 and ground. Similarly, the output of rectifier 26 is applied to the anode of a Zener diode 38 through a resistor 40, Zener diode 38 serving to provide voltage regulation between ground and junction point 39.

The voltage appearing at point 31 is applied to the emitter 44 of a double base diode or unijunction transistor 42 through the series arrangement of a variable resistor 46 and a resistor 48, emitter 44 being connected to ground through capacitor 50. A first base 54 of unijunction transistor 42 is connected to ground through a resistor 56 and the other base 58 of unijunction transistor 42 is connected to point 31 through a resistor 60.

Unijunction transistor 42 and its associated circuit components comprise a relaxation oscillator. The characteristics of a unijunction transistor, such as unijunction transistor 42 and its associated circuit components are such that with a constant voltage impressed between base 58 and base 54, very little emitter current flows until the potential at emitter 44 is raised above the potential at base 54 to an amount such as approximately 0.7 of the voltage between base 58 and base 54. If such point is exceeded, transistor 42 "fires," i.e., it is rendered heavily conductive whereby capacitor 50 rapidly discharges into emitter 44 and base 54, the output of the transistor appearing at base 54.

The firing arrangements in the circuit of the drawing comprise firing transistors 62, 64, and 66 and respectively and associated power transistors 68, 70 and 72. Transistor 62 comprises an emitter 74 connected to point 31 through a resistor 76 and to the base 78 of its associated power transistor 68. Emitter 74 is also connected to a fixed pole of a switch 80 through the cathode to anode path of a diode 82. The base 84 of transistor 62 is connected to point 39 through a resistor 90, a resistor 112, a resistor 92, a resistor 94 and a resistor 96, the junction 95 of resistors 94 and 96 being connected to point 39 through an indicating light 98. A capacitor 100 is connected in shunt with resistor 92. Base 84 is also connected to point 31 through the series arrangement of resistors 86 and 88, a capacitor 102 being connected between base 84 and the junction 87 of resistors 86 and 88. Collector 104 is connected to point 39 through resistors 106 and 108 and to point 93 through resistors 111, 110 and 112. A light 114 is connected between the junction 107 of resistors 106 and 108 and point 39. In transistor 68, the emitter 116 is connected to ground and the collector 118 is connected to the winding 120 of the motor 11.

In transistor 64, the emitter 134 is connected to point 31 through a resistor 136, to the base 138 of its associated power transistor 70 and to the fixed pole of switch 80 through the cathode to anode path of a diode 140. The base 142 is connected to point 87 through a parallel arrangement of a resistor 144 and a capacitor 146. Base 142 is also connected to point 105 through a resistor 148 and a resistor 150, a capacitor 152 being connected in shunt with resistor 150. In transistor 70, the emitter 154 is grounded and the collector 156 is connected to winding 124 of motor 11.

In transistor 66, the emitter 158 is connected to point 31 through a resistor 160 and to the base 162 of its associated power transistor 72. Emitter 158 is also connected to the fixed pole of switch 80 through the cathode to anode path of a diode 164. The base 166 is connected to point 87 through the parallel arrangement of a resistor 168 and a capacitor 170. Base 166 is also connected to point 109 through a resistor 172. A capacitor 174 is provided connected across resistor 110, point 173 being connected to point 39 through a resistor 176 and a resistor 178, a light 180 being connected between points 177 and 39.

In power transistor 72 associated with transistor 66, the emitter 183 is grounded and the collector 184 is connected to winding 122 of motor 11.

In the circuit, capacitors 100, 152 and 174 may suitably have the same value, resistors 90, 148 and 172 may have the same value, resistors 86, 144 and 168 may suitably have the same value, resistors 106, 176 and 94 may suitably have the same value, resistors 76, 136 and 160 may have the same value, resistors 111, 110, 112, 92, 150 and 181 may have the same value, and capacitors 102, 146 and 170 may have the same value. The values chosen for the resistors and the capacitors in the firing arrangement are such that only one of transistors 62, 64 and 66 will be conducting at any one time and correspondingly only one of transistors 68, 70 and 72 will be conducting at such time. The values of the resistors are also chosen such that when one of transistors 62, 64 or 66 conduct, they conduct substantially at saturation.

In considering the operation of the firing arrangement, it is seen that the output appearing at base 54 of transistor 42 is applied to junction 87 through a capacitor 186. If it is assumed that transistors 62 and 64 are initially nonconductive, the values of the components in the firing arrangement are so chosen whereby base 166 is sufficiently negative such that transistor 66 is fully conductive. When a positive pulse is produced at base 54 and appears at junction 87, such pulse, of course, appears at the bases of each of the firing transistors thereby tending to maintain transistors 62 and 64 in their nonconductive states. However, the charging action of capacitors 102, 146 and 170 across resistors 86, 144 and 168 respectively and capacitor 100 connected across resistor 92 will cause transistor 66 to be rendered nonconductive whereby the negative excursion of voltage at its collector is rapidly transmitted to base 84 through capacitor 100 and resistor 90 and transistor 62 is rendered conductive. In this manner, conductivity shifts from transistors 66 and 72 to transistors 62 and 68 at the time that a positive pulse is produced from unijunction transistor 42. Similarly, at the next appearance of a positive pulse at the output of transistor 42, the negative excursion of voltage at collector 104 of transistor 62 is rapidly transmitted to base 142 of transistor 64 through capacitor 152 and resistor 148 whereby transistor 64 and consequently transistor 70 are rendered conductive, transistor 62 being rendered nonconductive and transistor 66 being maintained in its nonconductive state. Accordingly, with the firing arrangement of this invention, there is provided a balanced phase continuous rotation of the current through the three power transistors 68, 70 and 72 and consequently through the windings 120, 124 and 122 of motor 11. Lights 114, 180 and 98 permit monitoring of the firing action.

The rotation of phases in the firing arrangement causes a magnetic field in the motor to rotate and thus produce rotation of the rotor of the motor through basic induction motor action. In this connection, it is to be noted that alhough the power applied to the three phases of the motor is a square wave, the transformer action provided by the stator-rotor combination of the motor and rotation transformer action effectively produce relatively good sine waves in the windings of the stator of the motor. The cathode to anode paths of diodes 126, 128 and 130 are provided between point 39 and the inputs to the windings of the motor respectively. These windings are connected in a wye configuration and a −20 volt source, for example, is applied to the mid-point of the wye. Since junction 39 may be at substantially −24 volts, the cathode to anode path of a reference diode 132 which may be a Zener diode is connected between the mid-point of the wye and the anodes of diodes 126, 128 and 130. Diode 132 is included to prevent the damage which might occur to a phase winding or a firing transistor in the event that a sudden turn-off occurred.

In the firing arrangement according to the invention, the phases of the motor are supplied in rotation by a current flowing continuously from the D.C. supply or can be supplied at each current pulse output from transistor 42 which permits operation without saturation of the windings at extremely low frequencies. As the frequency is increased to the point where the time for each phase is less than that required for saturation, there is continuous D.C. current supplied to the motor. To effect the above, there are provided the arrangement of transistors 186 and 188, switch 80, diodes 82, 140 and 164 and resistor 190.

In transistor 186, the emitter 192 is connected to ground, the base 194 is connected to point 31 through the cathode to anode path of a diode 196, a resistor 198 and a point on variable resistor 200. The collector 202 is connected to point 31 through a resistor 204, to the base 206 of transistor 188 and to the emitter 208 of transistor 188 through the anode to cathode path of a diode 210. Base 194 is also connected to point 39 through the series arrangement of a resistor 212 and resistor 190 and is connected to ground through the cathode to anode path of a diode 214. In transistor 188, the collector 216 is connected to the movable pole of switch 80, the fixed pole of switch 80 being connected to the anodes of diodes 82, 140 and 164 and, when switch 80 is closed, to point 39 through resistor 190.

Base 54 of transistor 42 is connected to point 39 through the series arrangement of a capacitor 218, a resistor 220 and the cathode to anode path of a diode 222, the base 224 of a transistor 230 being connected to the junction 221 of the cathode of diode 222 and resistor 220. The emitter 226 of transistor 230 is connected to the base 234 of a transistor 232 and the collector 228 of transistor 230 is connected to the collector 237 of transistor 232, the junction 235 of the collectors of transistors 230 and 232 being connected to the anode of diode 196. The emitter 236 of transistor 232 is connected to point 39, a capacitor 238 being provided between junction 235 and point 39.

In the operation of the current flow time limiting arrangement, with transistors 230 and 232 nonconductive, capacitor 238 tends to charge to ground potential. When a positive pulse appears at base 54 of transistor 42 to consequently render transistors 230 and 232 conductive, capacitor 238 is discharged.

Transistor 186 is part of a timing circuit which comprises variable resistor 200, resistor 198 and capacitor 238. In the operation of this circuit, capacitor 238 must be charged approximately to ground potential before base 194 is driven sufficiently positive to render transistor 186 conductive. Thus, there must be a definite time as essentially determined by the value of the setting on variable resistor 200 before transistor 186 can be rendered conductive and, with switch 80 closed, also consequently render transistor 188 conductive.

If the pulses from base 54 in transistor 42 occur more frequently than such definite time, capacitor 238 is never charged to ground potential and transistor 188 is not rendered conductive. Accordingly, with this arrangement with outputs from transistor 42 of low frequencies, the enabling of transistor 188 prevents the saturation of the motor windings since its collector output as applied to the bases of transistors 68, 70 and 72 through diodes 82, 140 and 164 respectively renders transistors 68, 70 and 72 nonconductive. At higher frequencies, those at which transistor 188 is not rendered conductive, the windings of the motor are permitted to draw continuous current. In the continuous current region means sensitive to frequency and/or current may be provided to vary the voltage applied through the power transistors to the motor windings to approach optimum motor operating efficiency and wider speed range.

While there has been shown a particular embodiment of this invention, it will, of course, be understood that it is not intended to be limited thereto since many modifications both in the circuit arrangements and in the instrumentalities employed therein may be made and it is therefore contemplated by the appended claims to cover any such modifications as fall within the true spirit and scope of the invention.

What is claimed as new and desired to be secured by Letters Patent of the United States is:

1. In combination with a polyphase motor having a given number of balanced phase windings, a unidirectional potential source, inversion means in circuit with said source for converting said unidirectional potential to an alternating current potential, switching means responsive to the application thereto of said alternating current potential for successively producing said given number of balanced phase outputs, means for discretely successively applying each of said last named outputs to a corresponding motor winding, and means responsive to a potential from said source which exceeds a chosen value for disabling said switching means.

2. In combination with a polyphase motor having a given number of balanced phase windings, a unidirectional potential source, inversion means in circuit with said source for converting said unidirectional potential to an alternating current potential having a frequency which is a function of the value of said unidirectional potential, switching means responsive to the application thereto of said alternating current potential for successively producing said given number of balanced phase outputs, means for discretely successively applying each of said last named outputs to a corresponding motor winding, and means responsive to the application thereto of said alternating current potential which exceeds a chosen frequency for disabling said switching means.

3. In combination with a polyphase motor having a given number of balanced phase windings, a unidirectional potential source, inversion means in circuit with said source for converting said unidirectional potential to an alternating current potential having a frequency which is a function of the value of said unidirectional potential, switching means responsive to the application thereto of said alternating current potential for successively producing said given number of balanced phase outputs, means for discretely successively applying each of said last named outputs to a corresponding said motor winding, means responsive to the application thereto of said alternating current potential which exceeds a chosen frequency for disabling said switching means, and means for selectively inserting said disabling means in circuit with said switching means.

4. In combination with a polyphase motor having a given number of balanced phase windings, a unidirectional potential source, inversion means in circuit with said source for converting said unidirectional potential to a rectangular wave potential having a frequency which is proportional to the value of said unidirectional potential, switching means responsive to the application thereto of said rectangular wave potential for producing said given number of balanced phase outputs, means for successively discretely applying the outputs of said switching means to a corresponding motor winding, timing means in circuit with said inversion means for producing an output having a value which varies inversely as the frequency of the output of said inversion means, disabling means responsive to the application thereto of the output of said timing means for producing an output only when the output of said timing means attains a prescribed value, and means for selectively inserting said disabling means in circuit with said switching means, an output from said disabling means preventing an output from said switching means whereby said switching means is disabled when the value of said unidirectional potential exceeds a chosen value.

5. In the combination defined in claim 4 wherein said inversion means comprises a relaxation oscillator including an active device and having an output frequency which is proportional to the value of a unidirectional potential applied thereto.

6. In the combination defined in claim 5 wherein said active device comprises a unijunction transistor comprising an emitter and first and second bases, said emitter having a time constant circuit associated therewith which determines the output frequency of said oscillator.

7. In the combination defined in claim 4 wherein said switching means comprises an active device means for each of said given number, means for applying operating potentials to said active device means, commutating means interconnecting said active device means, and means for simultaneously applying the output of said inversion means as an input to said active device means whereby said commutating means is operative to render said active device means successively conductive in accordance with the frequency of the output of said inversion means.

8. In the combination defined in claim 7 wherein each of said active device means comprises a first transistor to which there is applied as an input the output of said inversion means and a second transistor in circuit with and controlled by the output of said first transistor.

9. In the combination defined in claim 4 wherein said timing means comprises first active device means having a time constant arrangement in its output.

10. In the combination defined in claim 9 wherein said time constant arrangement includes a capacitance across which the output of said first active device means is developed, said capacitance discharging to a value which is inversely proportional to the frequency of the input to said first active device means.

11. In the combination defined in claim 10 wherein said disabling means includes second active device means in circuit with said timing means for producing an output only when said capacitance discharges to said prescribed value, and said means for selectively inserting said disabling means into circuit with said switching means comprises a normally open switch which when closed effects the application of the output of said disabling means to said switching means.

12. In the combination defined in claim 11 and further including means responsive to frequency and/or current to vary the outputs from said switching means applied to said motor windings.

References Cited by the Examiner
UNITED STATES PATENTS

| | | | |
|---|---|---|---|
| 2,784,365 | 3/1957 | Fenemore | 318—230 |
| 2,995,690 | 8/1961 | Lemon | 318—138 |

MILTON O. HIRSHFIELD, *Primary Examiner.*

JOHN F. COUCH, *Examiner.*